Nov. 10, 1959  G. A. MARSH ET AL  2,912,645
INDIRECTLY CONNECTED CORROSION-TEST PROBE
Filed Sept. 22, 1958

INVENTORS
GLENN A. MARSH
BY LYNN E. ELLISON
EDWARD SCHASCHL
Edward H. Lang
ATTORNEY United States Patent Office 2,912,645
Patented Nov. 10, 1959

2,912,645
INDIRECTLY CONNECTED CORROSION-TEST PROBE

Glenn A. Marsh, Lynn E. Ellison, and Edward Schaschl, Crystal Lake, Ill., assignors to The Pure Oil Company, Chicago, Ill., a corporation of Ohio Application September 22, 1958, Serial No. 762,651

10 Claims. (Cl. 324—65)

This invention relates to a corrosion-test probe having, in combination, means for exposing a corrodible test element or specimen to a corrosion atmosphere and means for indirectly detecting the change in resistance due to corrosion of the exposed test element. This invention relates particularly to the structure of the mounting of the test elements whereby the signals produced by the comparison-measuring parts is transmitted by induction to the measuring circuit, thus eliminating the problem of sealing lead wires through the wall of a vessel operating at a high temperature and pressure.

Corrosion-test probes which are temperature-compensating have been disclosed in certain previous patent applications by the present inventors and others. These devices take advantage of the methods that have been devised which make use of the correlation between change in electrical conductivity and change in cross-sectional area to determine the rate of corrosion of various materials of construction, through the use of corrosion-test probes mounted on various base elements and connected to electrical resistance-change meters.

The basic problem with which this invention is concerned is that of obviating the necessity of making special provisions for sealing electrical leads through base supporting members or plugs which are used to hold the test elements of the probe within a high-pressure vessel containing a corrosive atmosphere. The instant invention, as will be seen from the drawings, employs in place of the previous electrical leads a system of magnetic couplings which pick up and transmit the signals from the testing elements to the detecting circuits. The following copending applications are cited as disclosing recent modifications of the principle of resistance bridges functioning as analogue computers to indicate quantitatively the degree or rate of corrosion, and also disclose various forms of test elements which may be used in conjunction with the present invention.

| Serial No. | Filing Date | Inventors |
|---|---|---|
| 528,032 | Aug. 12, 1955 | G. A. Marsh and E. Schaschl. |
| 568,906 | Mar. 1, 1956 | E. Schaschl. |
| 597,368 | July 12, 1956 | L. E. Ellison. |
| 604,205 | Aug. 15, 1956 | G. A. Marsh and E. Schaschl. |
| 629,365 | Dec. 19, 1956 | E. Schaschl. |
| 629,077 | Dec. 18, 1956 | Do. |
| 696,682 | Nov. 15, 1957 | Do. |

The entire disclosures, drawings, circuits, principles of operation, and test element configurations of the aforementioned patent applications are hereby incorporated by reference. Certain modifications of the base member for supporting the test elements and carrying the magnetic couplings are to be described herein, incorporating the improvements of this invention.

It becomes, therefore, a primary object of this invention to provide a corrosion-test probe to be used with an electronic resistance-measuring apparatus, including means to indirectly pick up and transmit the signal therefrom to the measuring circuit.

Another object of the invention is to provide a new form of supporting base member and imbedded magnetic couplings for use in high-temperature and high pressure corrosion studies.

Still a further object of this invention is to provide indirectly connected corrosion-test probes and resistance-measuring circuitry for use in facilitating corrosion studies under high-pressure conditions.

These and other objects of the inventon will become apparent or be described as the invention is set forth in more detail.

The invention is best understood by reference to the attached drawings wherein.

Figure 1:
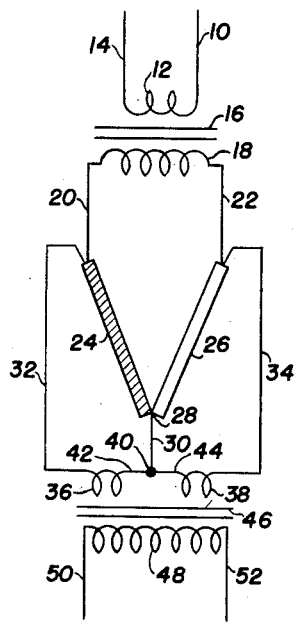
Figure 1 is a diagram showing the electrical connections between the various parts.

Referring to Figure 1, electrical conductor 10 is formed into coil 12 having return 14. Coil 12 is associated with core 16 which has secondary coil 18 within its magnetic field. Coil 18 has leads 20 and 22 connected to probe elements 24 and 26, respectively. Probe element 24 represents a protected test specimen and element 26 represents an unprotected test specimen. These test specimens are joined at common juncture 28 to common lead 30. Electrical leads, numbered 32 and 34, respectively, are attached to the other ends of each specimen, the first being formed into coil 36 and the second into coil 38 and each joining with common lead 30 at point 40 through leads 42 and 44. Core 46 is shown associated with coils 36 and 38 and with coil or winding 48, formed from leads 50 and 52.

In operation, an alternating voltage of about 10 to 25 volts at 40 to 500 cycles is applied to coil 12 via leads 10 and 14, and picked up by core 16. This induces a voltage in coil 18 which is applied to the test elements 24 and 26. Since coils 36 and 38 are connected across test elements 24 and 26, they reflect the voltages across the test elements. Since the voltages in windings or coils 36 and 38 are out of phase, no voltage is induced in winding 48 when the test elements 24 and 26 have the same resistance. As the unprotected element 26 corrodes and changes resistance, an unbalance is created which induces a voltage across coil 48. This voltage is picked up and conducted through leads 50 and 52 to a suitable amplifying and measuring device.

Figure 2:
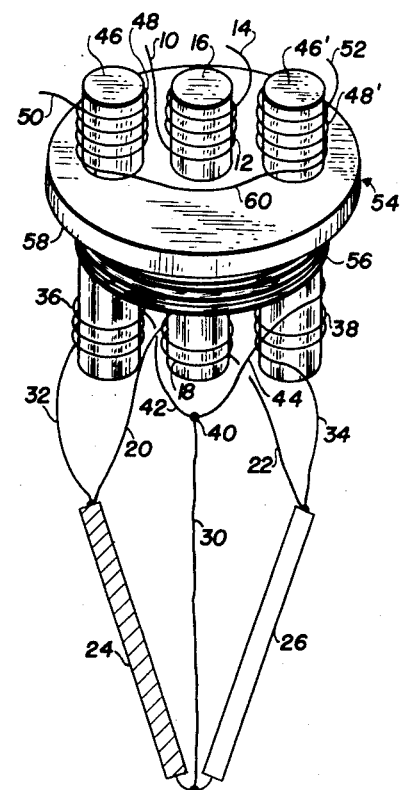
Figure 2 is an isometric view of one embodiment of the invention showing the relationship of the parts corresponding to the electrical circuitry shown in Figure 1.

Referring to Figure 2, wherein parts corresponding to those in Figure 1 are given the same number for ease in understanding the invention, there is provided a non-magnetizable base member 54 having threaded surface 56 and flange 58 to function as means for supporting the various parts and sealing same through a vessel or pipe wall confining the corrosive atmosphere to be tested. Core 46 is divided in two parts, indicated at 46 and 46', while core 16 is shown therebetween. These cores may be placed in any desired arrangement through base member 54, provided an adequate seal is made between the outer surfaces of the cores and the inner surfaces of the apertures through the base member holding same.

As shown in Figure 2, test elements 24 and 26 are supported from base 54 by means of leads 20 and 22 from coil 18 on core 16, and also by leads 32 and 34 leading from coils 36 and 38 on cores 46 and 46', respectively. Leads 42 and 44 are connected from coils 36 and 38 to point 40, and in turn to lead 30 to common juncture 28. Still following the circuit diagram of Figure 1, there is shown leads 50 and 52 at each end of coil 48 which is separated into two parts, 48 and 48', by auxiliary lead 60 which may be considered as part of coil 48—48'. Likewise, leads 10 and 14, from a power source (not shown), form into coil 12 surrounding core 16.

Figure 3:
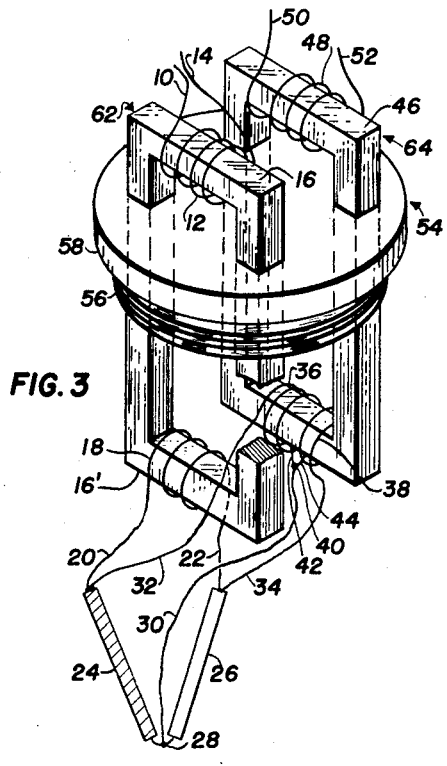
Figure 3 is an isometric view of another embodiment of the invention employing a different magnetic coupling arrangement.

In Figure 3 the electrical circuit of Figure 1 is followed again except that the shape of the cores has been changed. Instead of the substantially cylindrical cores used in Figure 2, the respective cores are formed from parts of loop cores 62 and 64. Thus, leads 10 and 14 join coil 12 around core 16 as a side of loop core 62. Coil 18 in turn is formed around core 16' which forms the opposite side of loop core 62 and leads 20 and 22 join, as before, to test elements 24 and 26 having common juncture 28. Corresponding parts of the remaining elements of the device are similarly shown in Figure 3.

Figure 4:
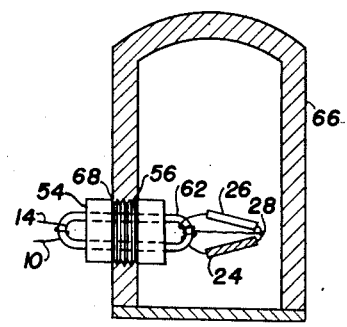
Figure 4 is a plane side view in partial cross-section to illustrate the manner in which the probe of this invention is mounted through the wall of a process chamber confining a corrosive atmosphere.

In Figure 4 the manner of attachment of the arrangement shown in Figure 3 is shown in relation to process vessel 66. Base member 54 fits within aperture 68 of the vessel wall through threads 56. Only the dominant parts of the probe are indicated in Figure 4 for simplicity.

A feature of this invention is the provision of a corrosion-test probe whereby the voltages involved in determining probe-element thickness changes are transmitted through a solid, metal-plate base-member by means of a magnetic coupling. In this way, no direct electrical connections are necessary and the probe assembly can be designed to withstand extreme pressures without danger of leakage or mechanical failure.

The base member 54 is constructed of any non-magnetic material of either metallic or non-metallic composition. Examples of non-magnetizable metallic materials of construction that may be used for base member 54 are brass, 18–8 stainless steel, Inconel and other known alloys of these types. Examples of non-magnetizable non-metallic materials of construction that may be used are various plastics, wood, ceramics, and glass. Obviously, more durability is obtained by fabricating base member 54 from a non-magnetizable metal or metal alloy.

The various cores used in the apparatus are made from metals or metal alloys which have the property of transmitting and maintaining a magnetic impulse, i.e., which are magnetizable. Any of the various soft iron alloy compositions available and commonly used for magnetic cores in transformers, electric motors, etc. may be used in fabricating the magnetic cores used in the device of this invention.

The cores 16, 46 and 46' should be tightly sealed in base 54 to withstand the pressures encountered during use of the device in process vessels. Where base 54 is metallic, an adequate seal can be obtained by welding, brazing, soldering or shrink-fitting the cores within and through the base member. Other means of attachment will become apparent to one skilled in this art.

In general, coils 12 and 18 may be called the power-input coils, while coils 36, 38 and 48 may be called the sensing coils. In each of these coils, the wire size selected in relation to the number of turns is somewhat a matter of choice, dependent upon the sensitivity desired in the instrument, the power source, and the electrical resistances of the test elements. These resistances are dependent on the cross-sectional area, length and composition of the elements.

In the power-input coils, the wire size and number of turns in coil 12 are matched to the input voltage supplied to the device. The number of turns in coil 18 is selected in relation to the number of turns in coil 12 so that the desired voltage is imposed across the test elements. The wire size of coil 18 is selected so that the impedance of the coil matches the impedance of the test elements.

In the sensing coils, the wire size and number of turns in coils 36 and 38 are selected so that their impedances are sufficiently high to avoid causing a phase shift in the bridge circuit. Because the impedances of the test elements are relatively high, the wire in coils 36 and 38 generally will be of relatively small diameter, such as 30 gauge, and a relatively large number of turns, for example around 400, will be required. A sufficient number of turns must be provided in coil 48 to obtain a suitable amplification and voltage gain. This also requires that wire of relatively small diameter be used. For example, 4000 turns of 40 gauge wire is satisfactory when coils 36 and 38 are as described above.

In general, core size is not critical. Soft iron cores having diameters of about ½ inch are satisfactory for our purpose.

The test elements 24 and 26 are preferably identical in electrical properties and dimensions. These test elements may be fashioned from any metallic material of construction, the corrodibility of which is to be studied. Thus the test elements are preferably initially of identical composition and size, thereby assuring practically identical electrical resistance properties. Corrections for differences in electrical resistance properties may be made as described in said copending applications infra. Measurements may be made directly with the device of this invention to determine the relative corrosivity of an atmosphere confined by a process vessel or pipe by constructing the test elements of the same material as the process vessel, etc. An indication of the best types of materials of construction to be used in handling a corrosive atmosphere during a process may be obtained by testing the effect had on different types of alloys used as test elements 24 and 26.

Test element 24 is described as having a coating to protect same from the corrosive atmosphere. For this purpose, any of the plastic compositions and coating materials known, which are resistant to the corrosive atmosphere, may be used. Examples are cited in the related applications. Coatings such as polyethylene, styrene, glue, paint, ceramics, rubber, etc., may be used; however, no allegations are made that these are equivalent for all types of protection that may be necessary. The purpose of having two test elements and shielding one from corrosion is to provide built-in temperature compensation in the instrument. The details of taking measurements, interpreting same and correlating the temperature compensation are explained in detail in the related applications. It suffices to state here that since both elements are connected in series, any thermo-electric effect due to temperature fluctuations in the atmosphere which takes place through one element will be off-set in the other element and not affect the readings obtained.

The device may be used in any corrosive atmosphere whether liquid, gaseous or mixed phase. The atmospheres tested may be alkaline, neutral or acid in nature or contain either organic or inorganic agents which cause the corrosion of metallic surfaces. The term corrosion is intended to include both chemical attack of the test element, wherein a portion of the exposed element is dissolved or gasified, and erosion, wherein the atmosphere may abrade the test element and cause mechanical loss of metal from the surface. Examples of corrosive atmospheres include hydrogen sulfide, inorganic acids and acid anhydrides, including hydrochloric acid and sulfuric acid, bases such as alkalis and amines, and abrasive mixtures, such as sand and air, fluidized catalyst and carrier gas, etc.

Although this invention has been described in relation to specific embodiments, it is not to be so limited. The cores may be of various shapes and have different cross-sections than cylindrical or rectangular as shown. Plug member 54 need not be cylindrical and may comprise any form of base element adapted to support the cores and test elements therefrom. Lead wires 20, 22, 30 and 34 are insulated and are preferably fabricated of conductor material of sufficient rigidity to support the test elements. Other arrangements may be used, such as by attachment of an insulated, separated support member from the base of member 54 to which the test elements are attached as by ceramic cement or Teflon. Although three non-magnetizable cores are shown in Figure 2 and two doughnut coils are shown in Figure 3, the invention is not to be limited thereby.

The test elements themselves may be any desired shape, including rods of different cross-sectional configurations, cylindrical, tubular, ribbon-shaped, etc. As shown, test elements 24 and 26 are ribbon-shaped. One form of test element that is readily fabricated comprises a ribbon about ¼ inch in width and 0.001 to 0.050 inch in thickness. The various points of connection of lead wires to the test elements and junctures are formed by soldering, welding or brazing. Preferably, silver solder is used for this purpose because of its permanence and low resistance.

The test probe as described and shown is illustrative and not to be considered as limiting the invention. One skilled in the art will observe various modifications and changes which are intended to be included within the scope of the invention as claimed.

What is claimed is:

1. A corrosion-test probe comprising, in combination, non-magnetizable means forming a support member, magnetizable means sealed within said support member and extending therethrough, and test elements electrically connected through said support member by means of electrical leads forming induction coils around the extended ends of said magnetizable means to establish indirect electrical connection through said support means.

2. The corrosion-test probe comprising, in combination, a non-magnetizable base-member, a magnetizable core-member sealed within said base member and having each of its ends extending beyond the opposite faces of said base-member, and a pair of test elements connected to electrical leads extending in sealed relationship through said base member and supporting said test elements, one of said leads forming a coil around the extended end of said core member, and a corresponding lead on the top of said base-member forming a coil around the other end of said core-member.

3. The corrosion-test probe in accordance with claim 2 in which a common supporting juncture extends from said test elements.

4. The corrosion-test probe in accordance with claim 2 in which one of said test elements is coated with a material to protect same from the corrosive atmosphere being tested.

5. The corrosion-test probe in accordance with claim 2 in which said magnetic core-member is a cylindrical solid member and said coils are wrapped circumferentially around the extended ends thereof.

6. The corrosion-test probe in accordance with claim 2 in which said base-member has a threaded extension to engage an aperture in a process vessel.

7. A corrosion-test probe comprising, in combination, a first test element, a second test element connected thereto at a common juncture at one end, a protective coating over said first test element, an electrical lead connected between the ends of said test elements opposite said common juncture, a first coil within said electrical lead, a first magnetizable core and second coil associated with said first coil, a second electrical lead connecting the ends of each of the said test elements through said common juncture, a third and fourth coil within said second electrical lead, said third and fourth coils each being between said common juncture and the ends of said second electrical lead, a second magnetizable core associated with said third and fourth coils, and a fifth coil associated with said second magnetic core to receive a signal proportional to any unbalance in said test elements due to the corrosion of said second test element.

8. A corrosion-test probe comprising, in combination, a non-magnetizable base-member, three magnetizable core-members extending through said base-member and having their ends extending beyond opposite faces of said base-member, a pair of test elements connected at one end to a common juncture, one of said test elements having a protective coating, a first electrical lead connected between the ends of said test elements and to a coil around the extended end of one of said cores, a second electrical lead connecting the ends of said test elements through said common juncture, a second and a third coil in said second electrical lead, said second and third coils being between said common juncture and the point of attachment to said test elements and being around the extended ends of the second and third of said cores, said first, second and third coils being on the same side of said base member, a third electrical lead forming a coil around said second and third cores and a fourth electrical lead forming a coil around said first core.

9. The corrosion-test probe in accordance with claim 8 in which said cores are substantially cylindrical in cross-section and are sealed through said base member.

10. A corrosion-test probe comprising, in combination, a non-magnetizable base-member, a pair of spaced magnetizable cores extending through said base-member, each of said cores comprising two side-members and the two end-members, said side-members being in sealed relationship within said base-member, a pair of test elements conected at one end to a common juncture, a first electrical lead connected between the unconnected ends of said test specimens and forming a first coil around an end-member of one of said cores, a second electrical lead connecting the unconnected ends of said test elements through said common juncture, said second electrical lead forming a second and a third coil around an end-member of the second core on the same side of said base-member, said second and third coils being between said common juncture and an unconnected end of each specimen, respectively, and electrical leads forming coils around the remaining end-members of said cores on the opposite side of said base-member.

References Cited in the file of this patent

UNITED STATES PATENTS 2,444,410     Keinath               June 29, 1948
2,504,395     Cross                 Apr. 18, 1950